United States Patent [19]

Bredvik

[11] 4,022,454
[45] May 10, 1977

[54] UNIVERSAL SELF-ALIGNING LOCATOR

[75] Inventor: Martin Bredvik, Mercer Island, Wash.

[73] Assignee: The United States of America as represented by the Secretary of the Air Force, Washington, D.C.

[22] Filed: Jan. 8, 1976

[21] Appl. No.: 647,529

[52] U.S. Cl. .............................. 269/100; 269/258; 269/315; 269/319

[51] Int. Cl.² .......................................... B25B 1/20

[58] Field of Search ........... 269/315, 319, 303–306, 269/258, 266, 95, 99, 100, 41

[56] References Cited

UNITED STATES PATENTS

| | | | |
|---|---|---|---|
| 1,582,307 | 4/1926 | Runnels | 269/303 |
| 2,563,169 | 8/1951 | Hughes | 269/305 |
| 2,908,303 | 10/1959 | Schmidt | 269/319 |

*Primary Examiner*—Al Lawrence Smith
*Assistant Examiner*—Robert C. Watson
*Attorney, Agent, or Firm*—Joseph E. Rusz; Arsen Tashjian

[57] ABSTRACT

An adjustable self-aligning locator for supporting a plurality of parts in their proper relative position for assembly and/or clamping to a machine bed and the like. The locator includes a support member having a base leg with a cam locking device for engagement with a T-slot on the machine bed and an upright leg with a side extension portion having an arcuate groove therein. An angle member having a matching arcuate shaped protuberance at one end in engagement with the arcuate groove in the upright leg extension provides an adjustable angle working face for contact with the workpiece.

3 Claims, 5 Drawing Figures

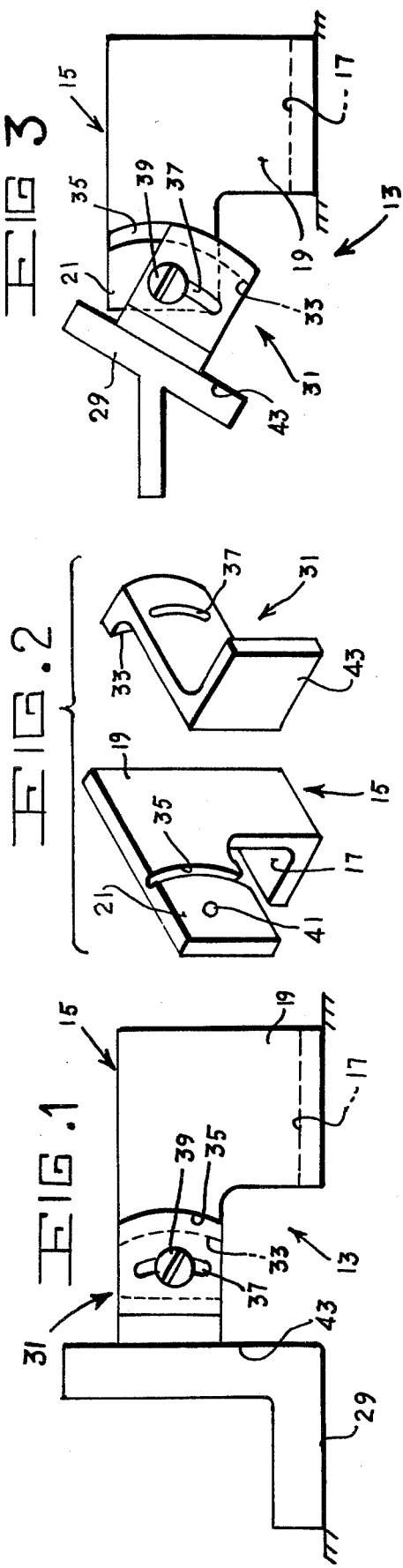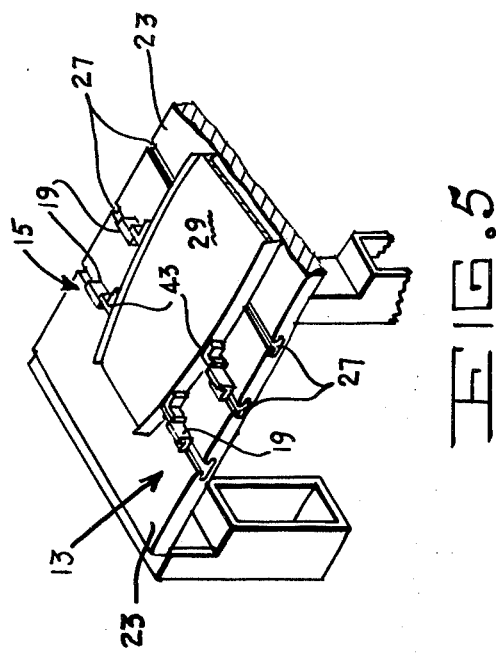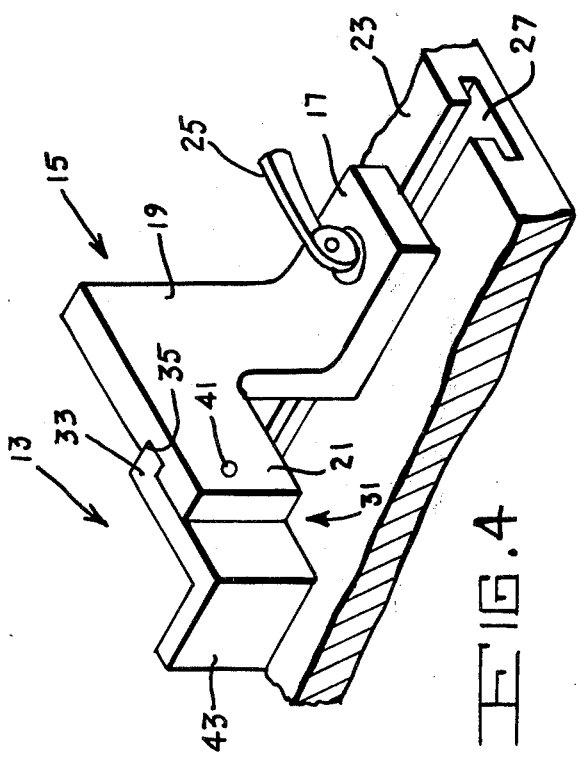

UNIVERSAL SELF-ALIGNING LOCATOR

STATEMENT OF GOVERNMENT INTEREST

The invention described herein may be manufactured and used by or for the Government for governmental purposes without the payment of any royalty thereon.

BACKGROUND OF THE INVENTION

This invention relates to an improved adjustable self-aligning locator and, more particularly, the invention is concerned with providing a self-aligning locator which will index to any machined angle or formed surface on a chord assembly while at the same time being suitable for use in clamping a workpiece to a machine bed or tee slotted table hereafter referred to as a machine bed.

Heretofore, it has been the practice in connection with the assembly of flanged parts to construct a fixture for the purpose of providing the necessary means for maintaining the parts in position preparatory to fastening them together. Also, similar fixtures have been used in the past to hold flanged elements to a machine bed during a machining operation, such as a milling fixture, and to prevent the flanged element from springing out of shape when the cutter exerts a force thereon.

Fixtures which are constructed in this manner for a specific machining operation on a particular flanged element can be very costly and wasteful. Much time and labor are involved in designing and building each fixture and, since it has very limited usefulness, the cost of the fixture must be added to the cost of the finished product.

The hereinafter described invention concerns a tooling concept that allows the same tooling to be used for various shaped parts. This eliminates the need for separate tooling for every part design. The savings thus gained from reduced tooling requirements is especially significant in prototype development such as aircraft design, where tooling is amortized over only one or two specially built units.

SUMMARY OF THE INVENTION

The present invention provides a capability of assembling an article by using a plurality of work holding devices abutting the parts to hold them in a desired arrangement during the fitting together and/or machining of the various parts that form the assembly. Angularly adjustable work holders are positioned to abut the workpiece. The work holders are then locked by the action of a cam arrangement or bar knob on a bolt having a head in a T-slot in the machine bed. Since the work holders can be placed in most locations on the machine bed and at any angle to the workpiece, the arrangement is suitable as a locator assembly for any shape and size of workpiece.

Accordingly, it is an object of the present invention to provide a self-aligning locator wherein the workpiece is held in position for assembly by a suitable number of clamps or locators set along the contour lines of the assembly generally along the chord.

Another object of the invention is to provide a self-aligning locator which is suitable for use in assembling a flanged article wherein the locator is readily adjustable to present any desired angle of inclination to the flange thereby securing the parts during the assembly procedure.

Still another object of the invention is to provide a self-aligning locator including means of holding the locator in any of its adjusted positions with a locking arrangement in combination with T-slots in a machine bed.

A further object of the invention is to provide a locator which is self-aligning for indexing to any machined angle on a chord assembly. A series of locators can be set to the mold line of assembly and held in place by standard T-slots thereby forming the assembly fixture.

A still further object of the invention is to provide a universal self-aligning locator having a support member which includes a base leg with a locking device for engagement with a T-slot in a machine bed and an upright leg with a side extension portion having an arcuate groove therein. An angle member with a corresponding arcuate end portion thereon is pivotably attached to the upright leg and engages the groove therein to provide a means for presenting the proper angle of inclination to the workpiece.

These and other objects features and advantages will become more apparent after considering the following description taken in conjunction with the annexed drawings and appended claims.

BRIEF DESCRIPTION OF THE DRAWINGS

FIG. 1 is a side view of the self-adjusting locator according to the invention with the angle member at the right angle portion to the machine bed;

FIG. 2 is a view showing the support and the angle members separately which are combined to form the locator assembly;

FIG. 3 is a side view of the self-adjusting locator with the angle member pivoted to match the angular orientation of the workpiece;

FIG. 4 is a general view in perspective of the assembled locator according to the invention showing the cam lock arrangement for attaching the support member to a machine base; and FIG. 5 is a view in perspective of a plurality of locators being used as an adjustable rib assembly jig on a tool base or machine bed showing the locators holding the parts along the chord line in the proper relative position.

DESCRIPTION OF A PREFERRED EMBODIMENT

Referring now to the drawings, there is shown a self-aligning adjustable locator clamp 13 which is constructed and arranged according to the teachings of my invention. As shown in the Figures, the locator 13 includes a support member 15 having a base leg 17 and an upright leg 19 with a side extension 21. The base leg 17 of the support member 15 is attached to the machine bed 23 by means of a cam lock arrangement 25 best shown in FIG. 4. The T-slot 27 in the surface of the machine bed 23 serves to retain the lower end of the cam lock assembly 25 therein, while allowing the locator unit 13 to be positioned wherever necessary to provide the required supporting function for the workpiece 29.

An angle member 31 is pivotably attached to the side extension 21 of the support member 15. One end of the angle member 31 is provided with an arcuate protuberance 33 which engages a corresponding arcuate groove 35 in the side extension 21. A curved slot 37 is included in the angle member 31 for receiving the shank of a screw 39. The threaded end of the screw 39 is threaded into a tapped hole 41 in the side extension 21 of the support member 15. The width of the slot 37 is slightly larger than the diameter of the shank of the screw 39 so that the members 15 and 31 can slide relative to each other when the screw 39 is not tightened. Alternatively, the arcuate protuberance 33 and corresponding arcuate groove 35 arrangement could be replaced by an arcuate slot in one member with two retaining bolts threaded into the matching member. The angle member 31 also includes a right angle workface 43 which abuts the workpiece 29 when the locator is in use.

In FIG. 1, there is shown a view of the locator 13 in position against a workpiece 29 with the work face 43 normal to the machine bed 23. In FIG. 3 the locator 13 is shown with the angle member 31 oriented to match the angle of the workpiece 29 so that the work face 43 is abutted thereto and in full contact therewith. In FIG. 5, there is shown a plurality of locators 13 attached to a machine bed 29 to form an assembly jig. The workpiece 29 which is shown, for example, as an inspar rib is held in position along the chord line so that the required machining and assembly operations can be carried out thereon.

Although the invention has been illustrated in the accompanying drawings and described in the foregoing specification in terms of a preferred embodiment thereof, the invention is not limited to this embodiment or to the particular configuration mentioned. It will be apparent to those skilled in the art that when the required assemblies are completed, the locators can be reset to the contour lines of a new assembly and the second assembly can then be fabricated. The locators are also useful in mill operations or the like to hold parts on a milling machine bed during the machining operation. It should be noted that certain changes, modifications and substitutions can be made, particularly with respect to the construction details without departing from the true spirit and scope of the appended claims.

Having thus set forth the nature of my invention, what I claim and desire to secure by Letters Patent of the United States is:

1. A universal self-aligning locator clamp for supporting a workpiece including a plurality of parts on a machine bed during assembly, said locator clamp comprising, in combination, a support member having a flat bottom base leg, an upright leg extending upward from one end of said base leg, a side extension on one side of the upper portion of said upright leg, and an angle member pivotably attached to the side extension on said support member; and means for removably attaching said support member to the machine bed, thereby permitting substantially universal movement of said locator clamp relative to the workpiece positioned on the machine bed.

2. The universal self-aligning locator clamp defined in claim 1 wherein the angle member pivotably attached to the side extension on said support member includes an arcuate protuberance on one end thereof, an arcuate groove of corresponding configuration disposed in one face of the side extension on said support member for engaging the protuberance on said angle member, and a screw passing through a curved slot in said angle member for locking said locator clamp at the desired angle in relation to the workpiece.

3. The universal self-aligning locator clamp defined in claim 2 wherein the means for removably attaching said support member to the machine bed includes a cam lock positioned on the base leg of said support member, said cam lock engaging a T-slot in the machine bed such that the operation of said cam lock causes the flat bottom of said support member to be pressed against the upper surface of the machine bed thereby preventing further relative movement of the locator clamp.

* * * * *